United States Patent
Santanocito et al.

(10) Patent No.: US 9,771,435 B2
(45) Date of Patent: Sep. 26, 2017

(54) PRODUCTION OF TEXTILE FROM CITRUS FRUIT

(71) Applicant: Adriana Maria Santanocito, Catania (IT)

(72) Inventors: Adriana Maria Santanocito, Catania (IT); Elena Vismara, Milan (IT)

(73) Assignee: ORANGE FIBER S.R.L. (IT)

( * ) Notice: Subject to any disclaimer, the term of this patent is extended or adjusted under 35 U.S.C. 154(b) by 0 days.

(21) Appl. No.: 14/907,577

(22) PCT Filed: Jul. 30, 2014

(86) PCT No.: PCT/EP2014/066377
§ 371 (c)(1),
(2) Date: Jan. 26, 2016

(87) PCT Pub. No.: WO2015/018711
PCT Pub. Date: Feb. 12, 2015

(65) Prior Publication Data
US 2016/0168275 A1    Jun. 16, 2016

(30) Foreign Application Priority Data
Aug. 8, 2013   (IT) .............. LO2013A0003

(51) Int. Cl.
| | |
|---|---|
| C08B 16/00 | (2006.01) |
| C08B 15/02 | (2006.01) |
| C08L 1/02 | (2006.01) |
| D21C 3/02 | (2006.01) |
| D21C 5/00 | (2006.01) |
| D21C 9/16 | (2006.01) |
| D21C 3/00 | (2006.01) |
| D21C 3/04 | (2006.01) |

(52) U.S. Cl.
CPC .............. *C08B 16/00* (2013.01); *C08B 15/02* (2013.01); *C08L 1/02* (2013.01); *D21C 3/003* (2013.01); *D21C 3/02* (2013.01); *D21C 3/04* (2013.01); *D21C 5/00* (2013.01); *D21C 9/163* (2013.01); *C08L 2205/025* (2013.01)

(58) Field of Classification Search
CPC .................................................... C08B 16/00
See application file for complete search history.

(56) References Cited

U.S. PATENT DOCUMENTS 3,193,445 A * 7/1965 Parker ............... D06L 3/021
                                          162/76
4,526,794 A * 7/1985 Altomare ............ A21D 2/36
                                          426/258

FOREIGN PATENT DOCUMENTS

WO    2015018711    7/2014

OTHER PUBLICATIONS

Yasar et al, Flow properties of cellulose and carboxymethyl cellulose from orange peel, 2007, vol. 81, Issue , pp. 187-199.*
Bicu et al, Cellulose extraction from orange peel using sulfite digestion reagents, 2011, Bioresource Technology, vol. 102, Issue 21, pp. 10013-10019.*
Foriegn priority documents for 14907577, 2014.*
Santangelo, Luisa: "Una catanese crea un tessuto con le arance" Orange fiber sostenibile ed economico, Aug. 23, 2012.
MD. Rabiul Islam, Tanvir Muslim and MD. Azizur Rahman: "Investigation on Orange Peel: Derivatization of Isolated Cellulosic Material and Analysis of the Fatty Acids Composition", Dhaka Univ.J.Sci., vol. 60, No. 1, Jan. 2012, pp. 77-78.
Ioan Bicu, et al: "Cellulose extraction from orange peel using sulfite digestion reagents", Bioresource Technology, Elsevier BV, GB, vol. 102, No. 21, Aug. 10, 2011 pp. 10013-10019.
Yasar, et al.: "Flow properties of cellulose and carboxymethyl cellulose from orange peel", Journal of Food Engineering, barking essex, GB, vol. 81, No. 1, Jan. 31, 2007, pp. 187-199.
Rondeau-Mouro C, et al.: "Structural features and potential texturising properties of lemon and maize cellulose microfibrils", Carbohydrate Polymers, Applied Science Publishers, Ltd., Barking, GB, vol. 53, No. 3, Aug. 15, 2003, pp. 241-252.
Paul Madus Ejikeme: "Investigation of the plysicochemical properties of microcrystalline cellulose from agricultural wastes I: orange mesocarp", Cellulose, Kluwer Academic Publishers,(Dordecht), NL, vol. 15, No. 1, Aug. 9, 2007, pp. 141-147.
International Search Report dated Sep. 23, 2014.

\* cited by examiner

*Primary Examiner* — Melvin C Mayes
*Assistant Examiner* — Stefanie Cohen
(74) *Attorney, Agent, or Firm* — Joseph Suhadolnik

(57) ABSTRACT

The present invention is directed to a process for producing spinnable cellulose at least in part from citrus fruits, such as oranges and lemons. In a preferred embodiment, cellulose is extracted from citrus fruits, discarded by the citrus fruits plantations and/or from parts of citrus fruits, waste of the industrial processing of citrus fruits derivatives. Cellulose is extracted from the entire peel of citrus fruits, which includes both albedo and flavedo, or only from albedo. Preferably, cellulose is obtained by chemical extraction, preferably in the absence of chlorine, comprising the treatment of raw materials derived from citrus fruits with hydrogen peroxide under basic conditions. Cellulose obtained by the process of the present invention is optionally mixed with cellulose obtained by different processes, for example with cellulose extracted from wood.

18 Claims, No Drawings

PRODUCTION OF TEXTILE FROM CITRUS FRUIT

BACKGROUND

Along with the exponential growth of the world population, the demand for food is continuously increasing. At the same time it is also increasing the demand for textile. The global consumption of textile is around 75 million tons per year and the textile market is expected to further grow by about 3% per year. This is especially due to the solid demographic growth in countries like China and India.

Differently from the last decades, during which the textile demand was mainly covered by synthetic fibers, cellulose fibers are now preferred because of their ideal textile properties, such as their better moisture management. Cotton has been for centuries the source of natural cellulose fiber (cellulose constitutes 90% of the cotton fiber). However, the continuous decrease of arable land is leading to a severe gap which is expected to result in food crisis and to a further reduction of the available land for cotton production. As a consequence, the demand for natural cellulose fiber has outweighed the supply. For this reason, artificial regenerated cellulose fiber production is growing (e.g. viscose, rayon, lyocell). Furthermore, artificial regenerated cellulose fibers have several advantages: for example, viscose high tenacity yarn has practically no shrinkage and it is absolutely thermally stable.

The artificial regenerated cellulose fiber production is mainly based on wood (the cellulose content of wood pulp is about 45%). The cellulose obtained from wood is mostly destined to paper production; however wood is also used, to a minor extent, to extract cellulose which can be processed to filament yarns. Clearly, the cost of production of cellulose from wood is high and not devoid of environmental repercussions. In particular, the provision of purified cellulose capable of being processed to filament yarns (alpha-cellulose) is very expensive.

In view of the growing demand for textile fibers, a strong need thus remains for providing artificial regenerated cellulose fiber by alternative and more sustainable processes, which can replace or integrate current production methods.

DESCRIPTION OF THE INVENTION

The present invention is aimed to a process for producing cellulose fiber capable of being spun to filaments (spinnable cellulose) at least partly from alternative sources.

In particular, the present invention is a process for producing spinnable cellulose from citrus fruits, such as orange and lemon. According to the present invention, cellulose is extracted from said citrus fruits. In a highly preferred embodiment, the citrus fruit employed in the present process is orange.

The terms cellulose or cellulose fibers are herein meant to indicate the polysaccharide of formula $(C_6H_{10}O_{15})_n$, composed of glucose units connected by a 1-4 beta glycosidic bond, and its fibers. Cellulose derivatives, for example chemical derivatives such as cellulose esters or ethers, are not comprised in the terms "cellulose" and "cellulose fibers" as used herein.

The process of the present invention is particularly advantageous, since it produces highly pure cellulose from a cheap raw material. In particular, the present process can represent a profitable alternative to the exclusive use of conventional natural or regenerated cellulose production processes. The present invention can in fact take advantage of the high amounts of citrus fruits that are discarded every year by the food industry.

For example, the process of the present invention can employ waste oranges as starting raw material. Oranges are cultivated for supplying food, for producing orange-derivatives (e.g. orange juices) and for the cosmetic industry. All these industrial fields produce huge amounts of orange waste. Italy, which is the second European country for orange production, produces about 500,000 tons/year of waste from citrus fruits. Entire fruits are discarded if they are not up to the expected quality or if they have been produced in excess. Also, industries which produce derivatives of citrus fruits (such as orange juice productions) discard the parts of the fruit that are not employed as final product (e.g. the orange skin). It is estimated for example that in Italy, out of 1,300,000-1,500,000 tons of oranges destined to juice production, only 40% of fruits is actually used. The waste deriving from the production of orange derivatives is thus about 700,000-1,000,000 tons/year in Italy. The corresponding data form the United States are even more stunning. The Unites States are the third world producer of citrus fruits: according to the Unites States Department of Agriculture, the production of citrus fruits has been estimated to be of about 11 million tons of per year. About 7 million tons, out of said 11 millions tons, are destined to the food processing industry (mainly for producing juices). About 40% of the fresh weight of the citrus fruits fed to the food processing industry becomes waste material. All this waste material represents an extra cost for industries, which have to discard the by-products according to the regulations in force.

The process of the present invention provides thus an efficient solution for capitalizing the whole material while reducing the costs of waste disposal.

Furthermore, compared to the production of natural cellulose fiber from cotton, the present process has many economic and environmental advantages. It has been estimated that the production of 1 kg of cotton textile requires about 11.000 liters of water. Of them, 45% water is represented by irrigation water, consumed by the plant. Differently, 1 kg of yarn obtained by citrus fruit waste requires from about 800 to about 1000 liters of irrigation water, thus much less compared to natural fiber. Furthermore, citrus fruit cultivations require less pesticide than cotton cultivations (about 127 g of pesticides for 1 kg of cotton versus about 1.6 g of pesticides for 1 kg of yarn from waste citrus fruits).

In one embodiment of the present invention, cellulose is thus extracted from waste citrus fruits discarded by the citrus fruits cultivations and/or from waste parts of citrus fruits discarded by the industrial production of citrus fruits derivatives.

The peel of citrus fruits is composed by two portions: one is the epicarp, also called flavedo (the colored portion of the peel), which is composed by cellulose material with other components, such as essential oils and pigments; the other one is the mesocarp or albedo, which is the inner white-colored portion, highly rich in cellulose.

In one embodiment of the present invention, cellulose is extracted from the whole peel of the citrus fruit, comprising both albedo and flavedo.

In a preferred embodiment cellulose is extracted only from albedo, consequently an embodiment of the inventive process further comprises separating albedo of the citrus fruit and extracting cellulose from it.

Many properties of cellulose depend on its crystallinity and chain length or degree of polymerization which greatly influence its solubility. Alpha cellulose is the carbohydrate portion of high grade cellulose that that does not dissolve during extractions in 5% and 25% w/w KOH or NaOH at room temperature according to standard TAPPI method T203. Alpha cellulose is the main constituent of cellulose fibers employed in textile manufacturing.

The process of the present invention surprisingly provides pure alpha cellulose, which is capable of being spun and form filaments. Alpha cellulose is obtainable from the peel of citrus fruit, preferably from albedo. The present invention is thus directed to a process for obtaining cellulose, preferably alpha cellulose, from citrus fruit. Preferably the citrus fruit is orange.

Preferably said cellulose is obtained by chemical extraction. Preferably, the extraction procedure is chlorine-free.

The cellulose obtainable by the process of the present invention is suitable for textile production. Thus, in one embodiment the process of the present invention comprises the preparation of a cellulose yarn by a cellulosic material which is at least in part composed of alpha-cellulose extracted from citrus fruits. Preferably, the cellulose yarn comprises at least 2 wt %, more preferably at least 5 wt %, alpha-cellulose extracted from citrus fruits.

Preferably, the process of the present invention does not employ chlorine-containing agents. This differs from the conventional methods of extraction of cellulose, for example from wood, which employ chlorine containing agents (for example chlorite sodium salts) that may produce chlorine radicals. Chlorine radicals can then react with cellulosic material and form toxic organochlorine. The process of the present invention is thus particularly advantageous also in view of the reduced amount of toxic waste produced by it.

The process of the present invention preferably comprises treating a raw material derived from citrus fruits with hydrogen peroxide in basic conditions. Preferably, said hydrogen peroxide is added to the raw material in a solution with sodium hydroxide. Preferably, said solution comprises from 1 v/v % to 3 v/v % hydrogen peroxide, more preferably it comprises about 2 v/v % hydrogen peroxide.

The pH of the solution is preferably adjusted with a base, more preferably with sodium hydroxide, to a pH of 10 to 13, more preferably to a pH of 11 to 12.

Preferably, the process of the present invention further comprises treating with hydrogen peroxide, in the presence of acids, the product obtained after treatment with hydrogen peroxide in basic conditions; preferably, said acids are carboxylic acids, more preferably acetic acid and/or formic acid. In a preferred embodiment, both acetic acid and formic acid are present, in equal volume amount.

The hydrogen peroxide treatments in basic and/or acid conditions are preferably carried out at a temperature of from 50° C. to 100° C., more preferably of from 65° C. to 90° C.

In a preferred embodiment after each extraction step, the solution is filtered and the solid comprising cellulose is recovered. Preferably, the solid recovered after filtration is washed with distilled water and optionally with acetone. Preferably, washing is carried out until a neutral pH is achieved.

In a preferred embodiment, the solid recovered after filtration is air dried or dried in an oven.

Preferably, the process of the present invention further comprises treating the material comprising cellulose obtained after hydrogen peroxide treatment in basic and optionally in acid conditions with sodium hydroxide, preferably 0.1-7 wt % sodium hydroxide, more preferably 0.5-6 wt % sodium hydroxide.

The starting raw material deriving from citrus fruits preferably comprises albedo and optionally flavedo. Preferably, albedo is separated from flavedo and cellulose is extracted from the sole albedo.

When the raw material deriving from the at least one citrus fruit comprises both the albedo and the flavedo, preferably the process comprises a first step of extraction wherein the starting material comprising albedo and flavedo is treated with solvents, preferably ethanol and toluene, before extraction.

In an exemplary embodiment, the process of the present invention comprises the following steps: a raw material deriving from citrus fruits is suspended in a solution of hydrogen peroxide; the solution is heated under mechanical stirring, preferably at a temperature of from 50° C. to 100° C., more preferably at a temperature of from 60° C. to 90° C., most preferably of from 65° C. to 80° C.; the pH of the solution is preferably adjusted to 10-13, more preferably to 11-12 with sodium hydroxide; then the solution is filtered and a first solid is recovered; said solid undergoes extraction into a solution comprising a carboxylic acid, preferably acetic acid and/or formic acid, to which hydrogen peroxide is added; the solution is heated at a preferred temperature of from 50° C. to 100° C., more preferably at a temperature of from 60° C. to 90° C.; the solution is preferably filtered and a second solid is recovered; the second solid is then suspended in a solution of sodium hydroxide, preferably 0.1-7 wt % sodium hydroxide, more preferably 0.5-6 wt % sodium hydroxide, at a temperature of from 80° C. to 120° C., preferably of from 90° C. to 110° C., and a final cellulose product is recovered. Preferably, the final product is recovered by filtration.

The cellulose obtained by the process of the present invention can comprise alpha cellulose in amount equal or greater than 90 wt %.

The cellulose obtained by the process of the present invention is optionally blended with cellulose obtained through different processes, e.g. cellulose extracted from wood. Preferably, the blend comprises at least 2 wt %, more preferably at least 5 wt %, cellulose extracted from citrus fruit. In this way, in textile production, it is possible to replace all or part of the cellulose extracted by conventional materials, e.g. from wood, with cellulose extracted with the present inventive process. In fact, the process of the present invention easily integrates with the conventional processes for extracting cellulose, such as the process of cellulose extraction from wood, as it shares common reagents and extraction conditions.

In one embodiment the whole process for obtaining cellulose from the citrus fruit, or at least part of it, is carried out in a conventional plant for extracting cellulose.

For example, the process of the present invention can be easily integrated in a conventional plant for extracting cellulose from wood. Said plant can thus extract cellulose by conventional processes, e.g. from wood, and/or by the process of the present invention, i.e. from citrus fruit.

EXAMPLES

In the following non-limiting examples, alpha cellulose is extracted through a chlorine-free procedure.

In a first example, alpha cellulose is extracted from the whole fruit. The whole fruit is treated with water and a mixture of organic solvents, preferentially ethanol and toluene, followed by hydrogen peroxide. Optionally the hydrogen peroxide can be used in a two-steps approach: the solution of the first step is preferentially basic (e.g. in the presence of NaOH), while in the second step hydrogen peroxide is mixed with acid, preferentially acetic and formic acid.

In a second example, alpha cellulose is extracted from the albedo, separated from the flavedo. When using the sole albedo as starting material, solvents' extraction can be skipped.

Example 1

The starting material is dry albedo with minor amounts of flavedo.

34 g of dry raw albedo (with minor amounts of flavedo) were cut into small pieces, enveloped in a paper sheet and extracted in a Soxhlet extractor at 69° C. with 500 mL solution of ethanol (275 mL), toluene (120 mL) and water (105 mL) for 32 hrs. The extracted solid 1A was dried in the oven to a constant height.

In this first step of extraction with solvents, 20 g of extracted solid 1A were recovered (about 60 wt % of the starting material).

Solid 1A was added to distilled water (1 L); 30 v/v % $H_2O_2$ (66 mL) was added (final concentration 2 v/v %) and the resulting suspension was heated at 70° C. under mechanical stirring. pH was adjusted to pH 11.5 with 4M NaOH and heating under continuous stirring for 2 hrs. An adjustment of pH was made after 1.5 hrs. The final solid 1B was filtered off at room temperature, washed with distilled water until the pH of filtrate was neutral (eventually washed with acetone) and air dried to constant height.

In this step of bleaching, 5.2 g of 1B were recovered (about 26 wt % of 1A material).

1B was swelled in 1:1 v/v formic and acetic acid solution (70 mL). After 30 min, 30 v/v % $H_2O_2$ (5 mL) was added (final concentration 2 v/v %). The suspension was heated under magnetic stirring at 80° C. for 1.5 hrs. 1C was recovered, filtered at room temperature and exhaustively washed with water to a neutral pH and finally with acetone; it is eventually dried on air.

In the peroxy acid extraction step, 3.85 g of 1C were recovered (about 77 wt % of 1B material).

1C was added to 1-5 w/v NaOH solution (150 mL) and heated at 100° C. under magnetic stirring for 1 h. After cooling, 1D was recovered, filtrated and washed to a neutral pH with distilled water followed by acetone and air dried.

3.46 g of 1D were recovered (about 90 wt % of 1C material). 1D appears as a white powder.

The overall yield in the present example is of 10 wt % of the starting material. The content of alpha cellulose in the final extraction product is greater than 90 wt %.

Example 2

The starting material is dry raw albedo, substantially separated from flavedo.

34 g of dry raw albedo were added to distilled water (1 L); 30 v/v % $H_2O_2$ (66 mL) was added (final concentration 2 v/v %) and the resulting suspension was heated at 70° C. under mechanical stirrer. pH was adjusted to pH 11.5 with 4M NaOH and heating under continuous stirring for 2 hrs. An adjustment of pH was made after 1.5 hrs. The final solid 2B was filtrated off at room temperature and washed with distilled water until the pH of the filtrate was neutral, eventually washed with 100 mL of acetone and air dried to constant height.

12 g of 2B material were recovered (about 35 wt % of the starting material).

2B was swelled in 1:1 v/v formic and acetic acid solution (70 mL). After 30 min 30 v/v % $H_2O_2$ (5 mL) was added (final concentration 2 v/v %). The suspension was heated under magnetic stirring at 80° C. for 1.5 hrs. 2C was filtrated at room temperature and exhaustively washed with water to a neutral pH and finally with acetone (100 mL); 2C is eventually dried on air.

6.7 g of 2C were recovered (about 56 wt % of 2B material).

2C was added to 1-5 w/v NaOH solution (300 mL) and heated at 100° C. under magnetic stirring for 1 h. After cooling 2D was filtrated and washed to a neutral pH with distilled water, then with acetone and air dried.

4.3 g of 2D were recovered (about 65 wt % of 2C) as white powder.

The overall yield was 12.6 wt % of the starting material.

The alpha cellulose obtained by the present process is alpha cellulose capable of being spun to filaments. The present examples demonstrate that by the process of the present invention it is possible to produce alpha cellulose from citrus fruit's waste. Furthermore, by starting from a material enriched in albedo it is possible to skip the first step of solvent's extraction, thus simplifying the process and increasing the overall yield.

The invention claimed is:

1. A process for producing spinnable cellulose, the process comprising extracting cellulose from at least one citrus fruit wherein the cellulose extracted from the at least one citrus fruit comprises at least 90 wt % alpha-cellulose, wherein the extraction of said cellulose from the at least one citrus fruit comprises steps:
    i) providing a raw material deriving from the at least one citrus fruit
    ii) treating said raw material with hydrogen peroxide in basic conditions and isolating a solid comprising cellulose.

2. The process of claim 1 wherein the at least one citrus fruit is an orange.

3. The process of claim 1 wherein the at least one citrus fruit is the waste of an industrial process.

4. The process of claim 1 wherein the extraction of said cellulose from the at least one citrus fruit is performed on albedo and optionally flavedo of the citrus fruit.

5. The process of claim 1, further comprising:
    iii) subjecting the solid comprising cellulose isolated in step ii) to extraction with a solution comprising a carboxylic acid to which hydrogen peroxide is added after which the solid comprising cellulose is recovered, and/or
    iv) treating the solid comprising cellulose obtained by any of steps ii) or iii) with sodium hydroxide.

6. The process of claim 5, wherein the carboxylic acid in step (iii) comprises acetic acid and/or formic acid and step (iv) comprises treating the solid comprising cellulose obtained by any of steps ii) or iii) with from 0.1 to 7 wt % sodium hydroxide.

7. The process of claim 1 wherein hydrogen peroxide is present in a solution comprising from 1 v/v % to 3 v/v % hydrogen peroxide.

8. The process of claim 4 comprising:
    separating albedo from flavedo before extraction of cellulose.

9. The process of claim 1, wherein the raw material comprises both albedo and flavedo; the process further comprising the steps of:
    treating albedo and flavedo with solvents.

10. The process of claim 1 wherein no chlorine-containing agents are used.

11. The process of claim 1 further comprising:
blending the cellulose derived from at least one citrus fruit with cellulose extracted from a different cellulose material and providing a blend of spinnable cellulose.

12. The process of claim 11 wherein the blend comprises of at least 2 wt %-cellulose extracted from citrus fruit.

13. The process of claim 1 wherein in step ii) said raw material is treated with a solution comprising from 1 v/v % to 3 v/v % hydrogen peroxide in the presence of sodium hydroxide, and further comprising steps
   iii) extracting the solid comprising cellulose isolated in step ii) with a solution comprising acetic acid and/or formic acid to which hydrogen peroxide is added after which the solid comprising cellulose is recovered, and/or
   iv) treating the solid comprising cellulose obtained by any of steps ii) or iii) with from 0.1 to 7 wt % sodium hydroxide sodium hydroxide,
wherein no chlorine-containing agents are used.

14. The process of claim 13, wherein the at least one citrus fruit is an orange and the raw material comprises both albedo and flavedo; the process further comprising the steps of:
treating albedo and flavedo with ethanol and toluene.

15. The process of claim 13, wherein the at least one citrus fruit is an orange and the raw material comprises albedo; the process further comprising the steps of separating albedo from flavedo before extraction of cellulose.

16. A process for producing cellulose yarn, the process comprising extracting with a solution of hydrogen peroxide cellulose from at least one citrus fruit, wherein the cellulose extracted from the at least one citrus fruit comprises at least 90 wt % alpha-cellulose, filtering the cellulose from the solution of hydrogen peroxide, and spinning the cellulose to produce the yarn.

17. The process of claim 16 wherein the at least one citrus fruit is an orange.

18. The process of claim 16 wherein the extraction of said cellulose from the at least one citrus fruit is performed on albedo and optionally flavedo of the citrus fruit.

* * * * *